UNITED STATES PATENT OFFICE.

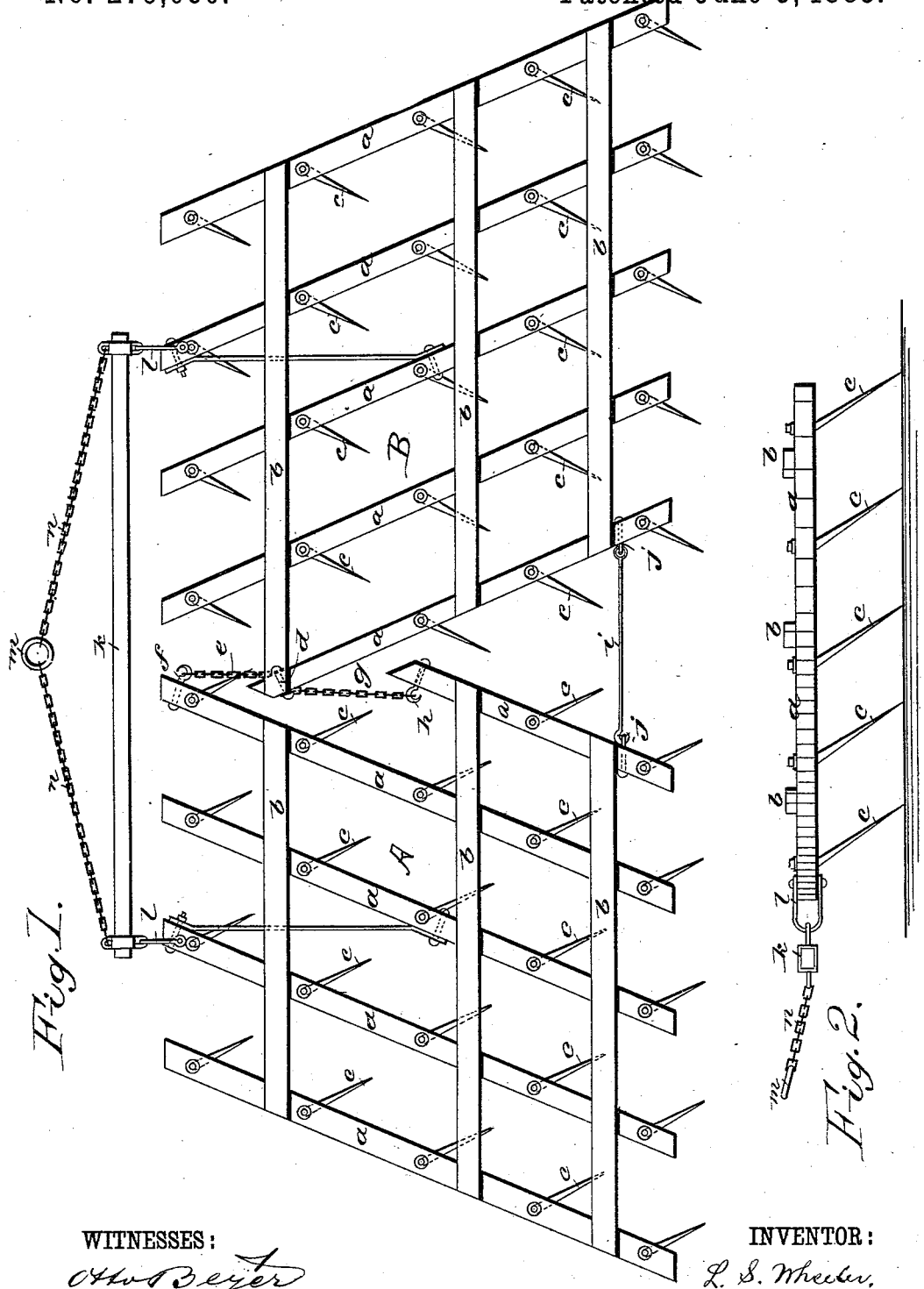

LAURENS S. WHEELER, OF INDEPENDENCE, KANSAS.

HARROW.

SPECIFICATION forming part of Letters Patent No. 279,060, dated June 5, 1883.

Application filed November 21, 1882. (No model.)

*To all whom it may concern:*

Be it known that I, LAURENS S. WHEELER, of Independence, in the county of Montgomery and State of Kansas, have invented a new and Improved Harrow, of which the following is a full, clear, and exact description.

My invention relates to improvements in harrows; and it consists in the peculiar construction and arrangement of parts, as hereinafter fully described, and pointed out in the claims.

Reference is to be had to the accompanying drawings, forming part of this specification, in which similar letters of reference indicate corresponding parts in both the figures.

Figure 1 is a plan view of a harrow constructed according to my invention, and Fig. 2 is a side elevation.

I make the harrow in two parts or sections, A B, to be connected side by side, so as to allow the respective sides to vibrate as on a longitudinal central axis, to accommodate itself to the uneven surface of the ground, the said two sections together being in the form of a frustum of an equilateral triangle, or thereabout, and being composed of a series of bars, $a$, parallel to the sides, and a series, $b$, parallel to the base of the triangle. To the harrow-frame thus constructed I propose to apply teeth $c$, so as to slope from each side toward the center, and also to slope rearward, substantially as shown—that is to say, centerward. The slope is to be such that the points of the teeth shall project about two inches toward the center for teeth of ordinary or medium length, and rearward they are to slope about forty degrees to the plane of the frame. By this slanting arrangement of the teeth the harrow is prevented from running to either side and caused to draw square behind the team, and it also prevents the tracking of the teeth, as they will do in rough ground when all set one way. For connecting the two sections of the harrow together, the inside bar $a$ of the section B, being shorter than full length for the proper matching of the sections, has a bolt, $d$, passing diagonally through it from side to side near the front end, from which at one end a chain, $e$, extends forward to a hook-bolt, $f$, in the front end of the innermost long bar $a$ of the left-hand section, and at the other end of said bolt $d$ another chain, $g$, extends rearward to a hook-bolt, $h$, in the end of the short bar $a$ of section A, said chains being parallel to the longitudinal axis of the harrow, and at the rear said sections are connected by the hooked rod $i$ and eyebolts $j$, said hook preventing the sections from swinging apart or closing together at the rear. For hitching the harrow to the team, the two sections are respectively connected to the ends of a strut or stretcher, $k$, by clevises $l$, and the ring $m$, to which the evener is connected, is attached to the stretcher by the chains $n$, making a simple contrivance for drawing the two parts of the harrow evenly, and at the same time allowing the harrow a suitable freedom of lateral swing within certain limits, dependent mainly on the length of the clevises $l$. The chains $e\ g$ also allow of some lateral vibration of the front ends of the two parts of the harrow with respect to each other, besides serving for the connection between said parts.

I am aware that harrows composed of two sections hinged together on the central line of the sections by loose connections or chains, so as to allow each section to vibrate independently to accommodate itself to the inequalities of the ground, have heretofore been used.

Having thus described my invention, what I claim as new, and desire to secure by Letters Patent, is—

1. In a harrow, the combination, with the sections A B, constructed substantially as herein shown and described, of the chains $e\ g$ and the bolts $d\ f\ h$, as and for the purpose set forth.

2. In a harrow, the combination, with the sections A B, constructed substantially as herein shown and described, of the chains $e\ g$, the bolts $d\ f\ h$, the rod $i$, and the eyebolts $j$, as and for the purpose set forth.

LAURENS S. WHEELER.

Witnesses:
GOODELL FOSTER,
A. W. ROXTON.